Oct. 19, 1948.   W. E. BARNES   2,451,604
APPARATUS FOR MEASURING DENSITY OF A THIXOTROPIC FLUID
Filed Aug. 22, 1945   2 Sheets-Sheet 2

*INVENTOR*
*WILLIAM E. BARNES*
BY
*ATTORNEYS*

Patented Oct. 19, 1948

2,451,604

UNITED STATES PATENT OFFICE 2,451,604

APPARATUS FOR MEASURING DENSITY OF A THIXOTROPIC FLUID

William E. Barnes, Beaumont, Tex., assignor to Sun Oil Company, Philadelphia, Pa., a corporation of New Jersey Application August 22, 1945, Serial No. 612,096

2 Claims. (Cl. 73—32)

This invention relates to means for determining the density of a fluid and is particularly adapted for use in determining the density of a thixotropic fluid such as the drilling mud used in the rotary drilling of wells.

In drilling wells by the rotary method, drilling mud is circulated down through the drill pipe and up through the annular space between the drill pipe and borehole. The mud functions to remove the cuttings from the borehole, to prevent caving of the borehole wall and to provide sufficient hydrostatic pressure to overcome the pressure of the formations penetrated. A close control of the density of the drilling mud throughout the drilling operation is generally highly desirable. On the one hand, it is necessary that the weight of the drilling mud be sufficient to provide a hydrostatic pressure adequate to hold back fluids such as gas or water in the formations encountered in order to prevent a blowout of the borehole. On the other hand, if the drilling mud becomes too heavy, the drilling fluid may be continuously forced into one or more of the formations penetrated resulting in the condition known as "lost circulation." During the course of the drilling frequent adjustment of the weight of the mud, as by the addition of weighting materials, is required to meet the varying conditions encountered. For instance, upon penetration of a gas sand, the mud stream may become considerably lighter due to absorption of gas, in which case it is important that the change in density of the mud fluid be detected immediately so that proper steps may be taken to increase the weight of the circulating mud and prevent a blowout. In some cases a variation in mud weight of only a small fraction of a pound per gallon may be sufficiently important to constitute the difference between satisfactory and unsatisfactory drilling progress. It is evident, therefore, that a continual accurate measurement of the mud density during the drilling operation is highly desirable.

It is an object of the present invention to provide apparatus for continuously measuring the density of a circulating fluid, which apparatus is designed specifically to operate on a thixotropic fluid such as drilling mud and to minimize inaccuracies of measurement tending to arise as a result of its thixotropic character.

The density measuring apparatus according to the invention utilizes the difference in pressure on two flexible diaphragms, vertically spaced within the fluid, as an indication of the fluid density. While other density measuring devices operating on a similar principle have been known heretofore, such devices have not been designed so as to be capable of accurate measurement when the fluid being measured has a thixotropic character, i. e. the tendency to undergo gelatin when quiescent but readily to revert to a fluid state upon agitation. I have found that for accurate measurement of the density of a thixotropic fluid such as drilling mud, the aforesaid diaphragms should be placed in a vertical position within the fluid and further that they should be so positioned as to permit free flow of the fluid across the face of the diaphragm. This arrangement minimizes gelation of fluid adjacent to the diaphragms so that inaccuracies of measurement resulting from the thixotropic nature of the drilling mud are eliminated or minimized.

For a more complete understanding of the invention, reference may be had to the accompanying drawings in which.

Figure 1:
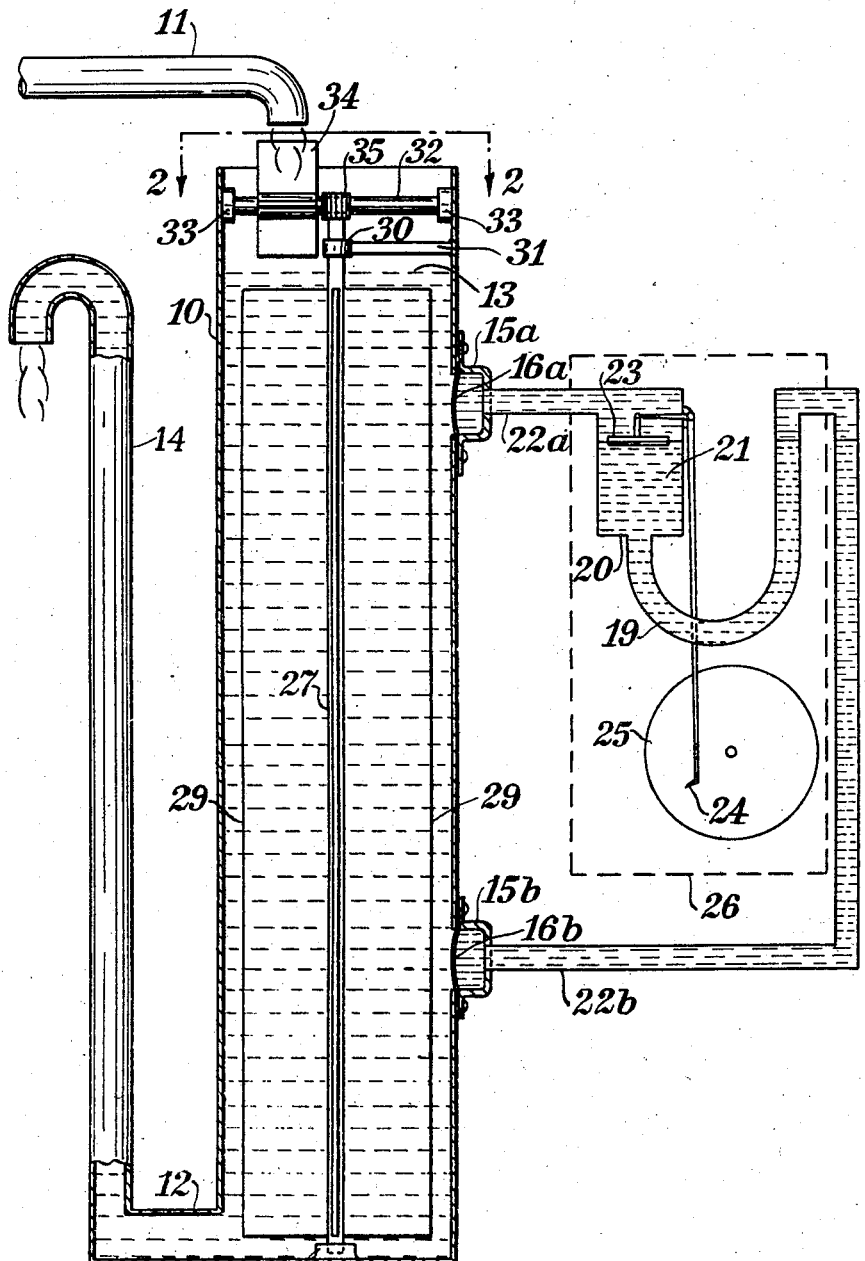
Figure 1 is an elevational view of one form of the assembled apparatus with some parts sectioned to show details.

Referring to the drawings in which like numerals designate like elements, a passageway for the flow of the fluid is illustrated in Figure 1 as a vertical chamber 10 having a fluid inlet 11 at the top and a fluid outlet 12 at the bottom. A minor stream of the drilling mud preferably is diverted from the main stream returning from the well bore and is passed continuously through inlet line 11 into the top of vertical chamber 10. Means are provided for maintaining the level of the fluid in the upper part of chamber 10, as shown at 13. Such means may comprise an overflow line 14 connected to outlet line 12 and having a point of overflow for the fluid at the desired level.

Figure 3:
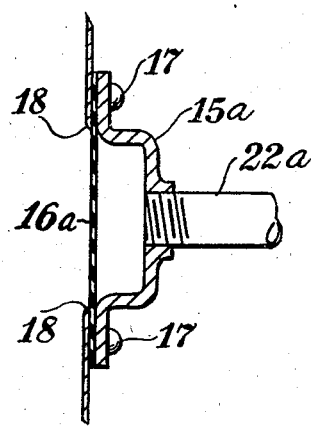
Figure 3 is an enlarged sectional view of the arrangement of diaphragm and housing.

Associated with the passageway or chamber are a pair of vertically spaced apart housings 15a and 15b and two flexible membranes or diaphragms 16a and 16b held by the housings. While the housings may extend within the chamber, if desired, and the diaphragms need not necessarily be fixed in vertical position, provided the arrangement is such as to permit substantially unobstructed flow of fluid across each of the diaphragms, the arrangement illustrated in Figure 1 and shown in more detail in Figure 3 is preferred. As shown in Figure 3 the housing 15a is positioned over an opening in the wall of the chamber and is secured to the wall by means of bolts 17. The diaphragm 16a extends over the opening and the edge of the diaphragm is anchored between the housing 15a and the wall. In order to minimize the effect of the wall as an obstruction to the free flow of fluid across the diaphragm, the wall thickness should be small relative to the width of the opening over which the diaphragm 16a is positioned, and the edge of the wall may be beveled as illustrated at 18.

A differential pressure indicating device is provided for measuring the difference in pressures exerted on the diaphragms by the fluid as an indication of the density of the fluid. For this purpose any suitable type of differential pressure device may be employed. As diagrammatically illustrated in Figure 1, the device may comprise a U-tube 19 having enlarged section 20 and containing mercury 21. The housings 15a and 15b are in communication with separate legs of the U-tube 19 by means of lines 22a and 22b, respectively. Lines 22a and 22b, as well as the space enclosed by each of the housings with its diaphragm, are filled with a liquid such as water or oil for transmitting the pressure exerted by the drilling fluid on each diaphragm to the differential pressure device. Enlarged section 20 of the U-tube contains float 23 which is adapted to float at the surface of the mercury 21 and to rise and fall in accordance with changes in its level. Float 23 is connected with scriber 24 through any conventional or suitable means for actuating the scriber in accordance with the movement of the float. Associated with scriber 24 is chart 25 driven by a clock mechanism and calibrated to show the density of the fluid being measured. Numeral 26 indicates an instrument panel (shown in broken lines) upon which the differential pressure indicating and recording device may be mounted.

Figure 2:
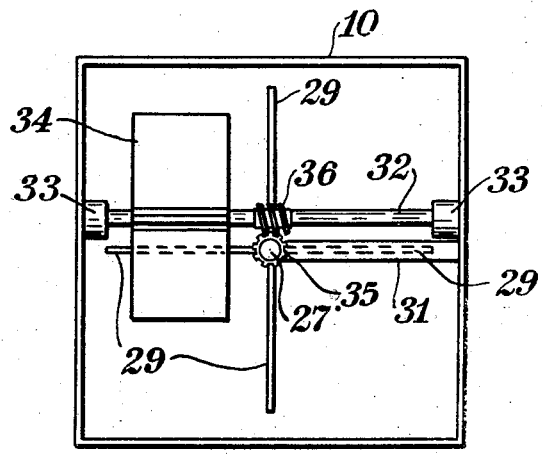
Figure 2 is a view taken on the line 2—2 of Figure 1.

As further shown in Figures 1 and 2, stirring means are provided for agitating the fluid within the passageway or chamber 10 to prevent gelation of fluid adjacent diaphragms 16a and 16b. Such means comprise a vertical shaft 27 centered within the chamber and supported for rotation in bearing 28 and carrying one or more blades 29 for stirring the fluid. The upper part of shaft 27 is supported by means of bearing 30 and support arm 31. In the upper part of the chamber a horizontal shaft 32, supported by bearings 33, carries a paddle wheel 34 fixed thereon. The stirring element, comprising vertical shaft 27 with blades 29 attached, is geared to horizontal shaft 32 by means of worm gear 35 and worm 36. Fluid inlet line 11 is placed with its outlet over paddle wheel 34 but off center so that the incoming fluid will cause paddle wheel 34 to rotate and thereby drive the stirring element. This prevents gelation of fluid within the chamber thus permitting accurate measurement of the fluid density at all times.

What I claim and desire to protect by Letters Patent is:

1. Apparatus for measuring the density of a thixotropic material such as drilling mud fluid which comprises a chamber for the passage of the fluid therethrough, said chamber being designed to maintain a body of fluid therein, a pair of pressure responsive flexible diaphragms vertically spaced apart with respect to the chamber in order to be responsive to the different pressures of the fluid existing at different levels within the chamber, agitating means within the chamber and power means for operating the agitating means in order to minimize gelation, adjacent the diaphragms, resulting from the thixotropic nature of the fluid, a differential pressure indicating device exteriorly of the chamber and means controlled by each of said diaphragms to operate said device in accordance with the difference in pressures obtaining at the said different levels.

2. Apparatus for measuring the density of a thixotropic material such as drilling mud fluid which comprises a chamber for the passage of the fluid therethrough and being designed to maintain a body of fluid therein, said chamber having a pair of apertures in its wall which are spaced apart vertically thereof, a diaphragm secured adjacent to and closing each aperture, said diaphragms being thus positioned at different levels and each being responsive to the pressure of the fluid obtaining at its level, agitating means within the chamber and power means for operating the agitating means in order to minimize gelation, adjacent the diaphragms, resulting from the thixotropic nature of the fluid, a differential pressure indicating device exteriorly of the chamber and means controlled by each of said diaphragms to operate said device in accordance with the difference in pressures obtaining at the said different levels.

WILLIAM E. BARNES.

REFERENCES CITED

The following references are of record in the file of this patent:

UNITED STATES PATENTS

| Number | Name | Date |
| --- | --- | --- |
| 35,152 | Hogg | May 6, 1862 |
| 1,136,789 | Fritchie | Apr. 20, 1915 |
| 1,178,902 | Brindle | Apr. 11, 1916 |
| 1,669,460 | Galdi et al. | May 15, 1928 |
| 1,686,688 | Fechheimer | Oct. 9, 1928 |
| 1,878,801 | Perkins | Sept. 20, 1932 |
| 2,279,254 | Irwin | Apr. 7, 1942 |
| 2,338,825 | Stoner | Jan. 11, 1944 |
| 2,369,707 | Baak | Feb. 20, 1945 |